United States Patent [19]

Schimelpfenig

[11] 3,890,388

[45] June 17, 1975

[54] RING CHLORINATION OF ORTHO-TOLUIDINE

[75] Inventor: Clarence William Schimelpfenig, Wilmington, Del.

[73] Assignee: E. I. du Pont de Nemours & Co., Wilmington, Del.

[22] Filed: Mar. 4, 1974

[21] Appl. No.: 447,873

[52] U.S. Cl. .................................. 260/578; 260/578
[51] Int. Cl. .......................................... C07c 87/60
[58] Field of Search ...................................... 260/578

[56] References Cited
UNITED STATES PATENTS

| | | | |
|---|---|---|---|
| 1,930,754 | 10/1933 | Hauas et al. ...................... | 260/578 X |
| 2,010,841 | 8/1935 | Bender ............................ | 260/578 X |
| 3,341,595 | 9/1967 | Doering ....................... | 260/578 UX |
| 3,396,195 | 8/1968 | Visser ................................ | 260/578 |
| 3,453,335 | 7/1969 | Starnes ........................... | 260/578 X |
| 3,676,421 | 7/1972 | Fahey ............................. | 260/578 X |
| 3,754,034 | 8/1973 | Crocker ............................ | 260/578 |

*Primary Examiner*—Paul F. Shaver
*Attorney, Agent, or Firm*—James A. Costello

[57] ABSTRACT

A process for reacting ortho-toluidine in concentrated sulfuric acid with at least one mole of chlorine per mole of ortho-toluidine at a temperature from about 20° to 100°C., to produce 4-chloro-2-aminotoluene and 6-chloro-2-aminotoluene.

3 Claims, No Drawings

RING CHLORINATION OF ORTHO-TOLUIDINE

BACKGROUND OF THE INVENTION

Direct chlorination of aminobenzene compounds normally causes oxidation of the amino group to give a variety of undesired products. The chlorotoluidines are usually obtained by chlorinating the appropriate nitrotoluenes, separating the isomers if desired, and reducing the nitro group to the amine. Aminobenzene compounds can also be chlorinated by tying up the amino group through acylation, chlorinating, and hydrolyzing the acylamino group to recover the free amino compound. The prior art does not disclose successful direct chlorination of ortho-toluidine in any solvent or reaction medium.

SUMMARY OF THE INVENTION

This invention concerns the direct chlorination of ortho-toluidine to produce 4-chloro-2-aminotoluene and 6-chloro-2-aminotoluene, the process comprising reacting ortho-toluidine dissolved in concentrated sulfuric acid with at least one mole of chlorine per mole of ortho-toluidine, at a temperature from about 20°C. to 100°C.

The concentration of the concentrated sulfuric acid solvent/reaction medium is between about 90% to 100%. Preferably, the concentration is between 95% to 97%. The preferred reaction temperature is between 40° to 60°C. The novel process avoids the steps of acylation before chlorinating and of hydrolysis after chlorinating which have hitherto been regarded as necessary for chlorination of ortho-toluidine. Furthermore, the chlorinated products are produced efficiently, in good yield and with very low by-product formation.

DETAILS OF THE INVENTION

In the process of the invention ortho-toluidine is mixed with concentrated sulfuric acid in a mole ratio of between about 1:4 to 1:8, respectively. This operation requires cooling to keep reaction temperature below about 20°C. The mixing is preferably carried out below 0°C.

The mixture is then heated to 20° to 100°C. and chlorine gas is added as fast as it is taken up by the charge. Reaction times of about 10 hours are commonly experienced. The reaction is exothermic, and some cooling may be required to keep the temperature in the desired range. Samples can be analyzed by gas chromatographic methods to determine composition.

The amount of ortho-toluidine in the chlorinated product can be limited to 10% or less by employing the process of this invention. The amount of dichlorinated byproduct is not appreciable when the ortho-toluidine in the product is about 10%. The amount of dichlorinated byproduct does increase somewhat, however, as the amount of ortho-toluidine approaches zero.

In working up the crude chlorinate, the mass can first be poured into twice its weight or more of chilled water or ice and water. After cooling to below 25°C., the drowned charge can be made basic with 30% caustic soda solution and the organic part extracted with a water immiscible solvent such as diethyl ether, benzene, toluene, or chlorobenzene. The solvent solution can be separated from the aqueous part, dried, filtered and the solvent removed. Generally, the crude concentrate will comprise about 5% water, 5% ortho-toluidine, 80% to 85% 4-chloro-2-aminotoluene and 6-chloro-2-aminotoluene, and the remainder residual solvent.

The crude material can be purified by fractional distillation under reduced pressure (10 mm Hg, absolute pressure). The organic product, free of water and solvent, is normally 5% to 10% ortho-toluidine and the remainder is 4-chloro-2-aminotoluene and 6-chloro-2-aminotoluene in about a 3:4 proportion. Overall yields of 80% to 85% of the two chlorinated amines are usually obtained.

Chlorination proceeds more slowly at lower temperatures and more quickly at higher temperatures. At temperatures above 100°C., however, production of some dichlorinated product is likely before monochlorination is complete, and such temperatures should be avoided. Efficient agitation aids in increasing chlorination rate.

The following Example is an illustration of the process of this invention.

EXAMPLE

Into a suitable flask was charged 800 grams of 95.9% sulfuric acid, and the temperature of the acid was reduced to 0°C. by exterior cooling. To the cold acid 214.4 grams of ortho-toluidine was added over a 30 minute period maintaining temperature below 0°C. The charge was heated to 50°C. over 25 minutes and chlorine gas was bubbled in at a rate slow enough to allow complete absorption of the gas in the liquid. After 10 hours chlorine addition was stopped. Gas chromatograph analysis indicated the presence of only about 8.8% unchlorinated ortho-toluidine with only trace dichlorinated product formation.

The reaction mass was then poured into 2,000 grams of wet ice with vigorous stirring. With temperature below 25°C., 33% sodium hydroxide solution was added until pH was above 7.0. The liquid was extracted with three portions of extractant prepared by mixing 200 ml of diethyl ether and 400 ml of water. The ether extracts were combined and dried over anhydrous MgSO$_4$. The ether was then evaporated, leaving 301.4 grams of liquid.

Gas chromatograph analysis of the solid indicated 7.1% ether, 4.7% water, 5.4% toluidine and 82.8% mixed 4-chloro-2-amino-toluene and 6-chloro-2-aminotoluene. Distillation of the mixture through a Vigreux column under 10 mm absolute pressure to remove ether and water produced 260 grams of distillate containing 7.4% ortho-toluidine, 39.7% 4-chloro-2-aminotoluene and 52.9% 6-chloro-2-aminotoluene. This represents an 85% yield of the mixed chloroaminotoluenes.

The embodiments of the invention in which an exclusive property or privilege is claimed are defined as follows:

1. A process for making 4-chloro-2-aminotoluene and 6-chloro-2-aminotoluene comprising reacting ortho-toluidine in 90% to 100% concentrated sulfuric acid with at least one mole of chlorine per mole of ortho-toluidine, at a temperature of from 20°C. to 100°C.

2. A process according to claim 1 wherein the concentration of the sulfuric acid is between 95% to 97%, and the reaction temperature is between 40° to 60°C.

3. A process according to claim 1 wherein the ortho-toluidine is present with the sulfuric acid in a mole ratio of between 1:4 to 1:8, respectively.

* * * * *